US009014985B2

(12) United States Patent
Alford et al.

(10) Patent No.: US 9,014,985 B2
(45) Date of Patent: Apr. 21, 2015

(54) SYSTEM AND METHOD FOR COMPENSATING TIME AND OFFSET VARYING NEAR-SURFACE EFFECTS IN SEISMIC DATA BACKGROUND

(75) Inventors: Richard B. Alford, Concord, CA (US); E. Frederic Herkenhoff, Orinda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 509 days.

(21) Appl. No.: 12/799,741

(22) Filed: Apr. 30, 2010

(65) Prior Publication Data

US 2011/0270527 A1 Nov. 3, 2011

(51) Int. Cl.
*G01V 1/00* (2006.01)
*G01V 1/36* (2006.01)

(52) U.S. Cl.
CPC ............ *G01V 1/364* (2013.01); *G01V 2210/20* (2013.01)

(58) Field of Classification Search
CPC ............................. G01V 1/364; G01V 2210/20
USPC ...................................... 702/17, 14
See application file for complete search history.

(56) References Cited

U.S. PATENT DOCUMENTS

| 5,745,392 A * | 4/1998 | Ergas et al. .................. 708/203 |
| 2011/0213556 A1* | 9/2011 | Yu et al. .......................... 702/14 |

OTHER PUBLICATIONS

Claerbout, J.F., 1978, Snell Waves; Stanford Exploration Project Report No. 15, 57-72, Stanford University.
Yilmaz, Ozdogan, 2001, Seismic Data Analysis, vol. 1 pp. 920-937: Society of Exploration Geophysicists.
PGS GeoStreamer®, Tech Link, Oct. 2007.
Domenico, Harnessing the Ghost, Geophysics, vol. 55, No. 5, May 1990.
Hammond, Ghost Elimination From Reflection Records, Geophysics, vol. XXVII, No. 1, Feb. 1962.
Lindsey, Elimination of Seismic Ghost Reflections by Means of a Linear Filer, Geophysics, vol. XXV. No. 1, Feb. 1960.
Nan Ma, Seismic Imaging of Receiver Ghosts of Primaries Instead of Primaries Themselves, Thesis, Office of Graduate Studies of Texas A&M University.
Shugart, Improvement of Marine Seismic Data as a Result of Source Signature Studies, Offshore Technology Studies, May 1978.

* cited by examiner

*Primary Examiner* — Tung S Lau
*Assistant Examiner* — Xiuquin Sun
(74) *Attorney, Agent, or Firm* — Marie L. Clapp

(57) ABSTRACT

A system for and computer implemented method for transforming seismic trace information includes obtaining seismic trace information for each trace, the seismic trace information including shot to receiver offset and the vertical velocity of at least one subsurface primary reflector and including respective information resulting from near-surface layering and velocity effects and relating to the primary reflector, reversibly transforming seismic trace information from each non-zero offset trace such that the respective information resulting from the near-surface effects at each non-zero offset position is moved in a time dimension such that they become effectively periodic with respect to respective primary reflector information and in accordance with a periodicity for a zero offset trace at the same surface location, filtering the transformed seismic trace information to remove at least a portion of the information resulting from near-surface effects, and inverting the reversible transforming.

14 Claims, 8 Drawing Sheets

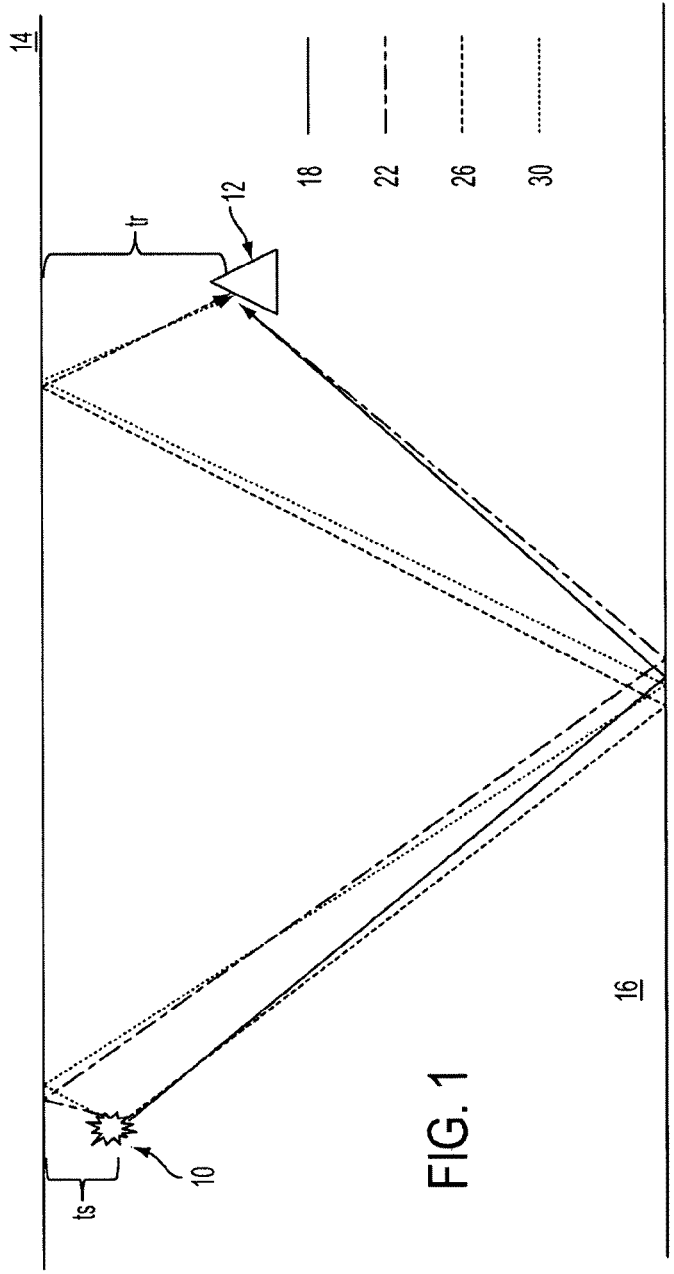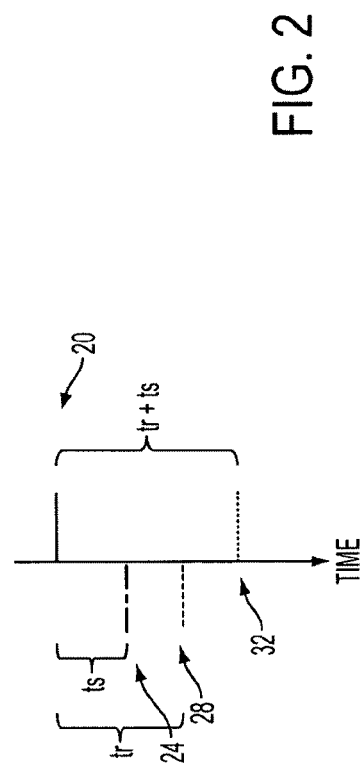

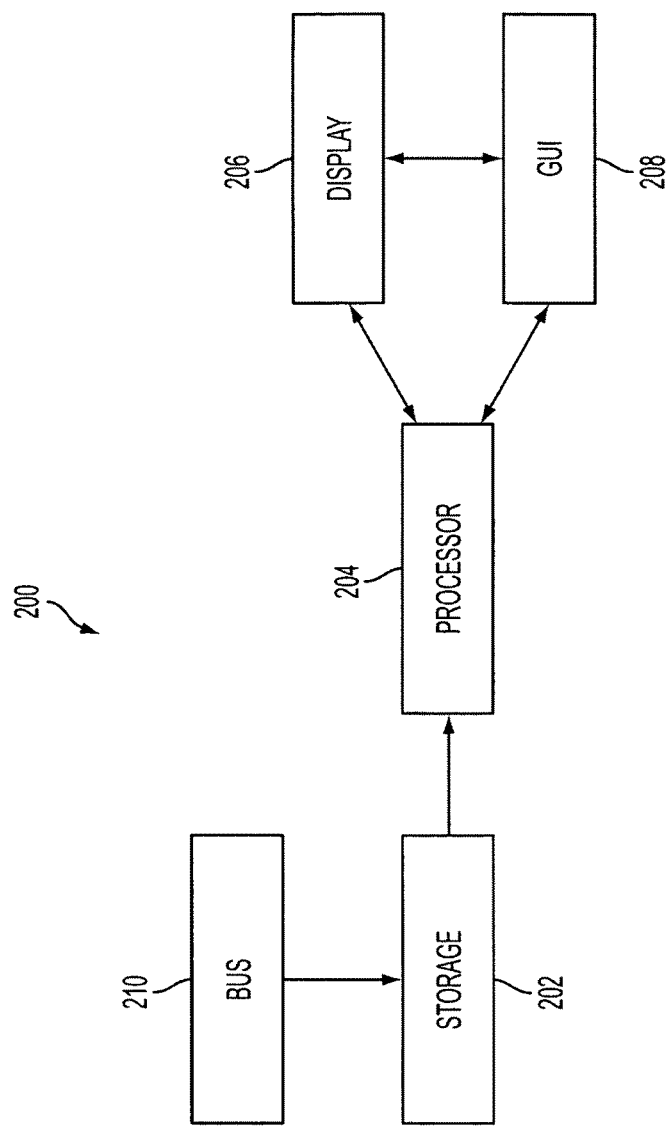

SYSTEM AND METHOD FOR COMPENSATING TIME AND OFFSET VARYING NEAR-SURFACE EFFECTS IN SEISMIC DATA BACKGROUND

BACKGROUND

1. Field

The present invention relates generally to processing of seismic data to remove artifacts and particularly to artifacts resulting from near surface filtering effects and ghost reflections.

2. Background

During the last 25 years, the oil and gas industry has sought to gain more subsurface property information from seismic data. In particular, it is desirable to obtain detailed information about subsurface pore fluids, porosity, lithology, pressure and geometry. In order to glean this information from seismic data, it is necessary to compensate for a variety of effects that tend to obscure the nature of the subsurface properties under investigation.

Among the effects of interest are those that are due to near surface conditions including, for example, ghosts or layering contrasts. For near offset measurements, the reflected signal should undergo near surface filtering in conformance with a convolutional model of seismic data (i.e., it should be possible to model the received signal as a time invariant wavelet convolved with the earth reflectivity). Where larger offsets are involved, each arriving reflection undergoes a different near surface filtering effect that is determined by local near surface geology and the initial and arrival angles of wavefronts at the source and receiver locations.

Existing models generally make use of an assumption that near surface filters have effects that are independent of wavefront takeoff/arrival angles. Other methods may be limited by spatial aliasing and truncation effects of the 2D or 3D common source and receiver gather transforms (tau-p or slant stack, for example) that directly estimate emergence angle responses for all angle event.

Accordingly, the inventors have determined that the present invention may allow for an improved compensation for near surface effects when analyzing seismic data representative of subsurface geological structures and properties.

SUMMARY

An aspect of an embodiment of the present invention includes a computer implemented method for transforming seismic trace information includes obtaining seismic trace information for each trace, the seismic trace information including shot to receiver offset and the vertical velocity of at least one subsurface primary reflector and including respective information resulting from near-surface layering and velocity effects and relating to the primary reflector, reversibly transforming seismic trace information from each non-zero offset trace such that the respective information resulting from the near-surface effects at each non-zero offset position is moved in a time dimension such that they become effectively periodic with respect to respective primary reflector information and in accordance with a periodicity for a zero offset trace at the same surface location, filtering the transformed seismic trace information to remove at least a portion of the information resulting from near-surface effects, and inverting the reversible transforming.

DESCRIPTION OF THE DRAWINGS

Other features described herein will be more readily apparent to those skilled in the art when reading the following detailed description in connection with the accompanying drawings, wherein:

FIG. 1 is a schematic illustration of seismic data acquisition illustrating a source, receiver, primary reflector and associated ray paths for primary and ghost events;

FIG. 2 is single seismic trace illustrating a primary event and associated ghost events along a time axis;

FIG. 8a illustrates input data representing a primary and related ghost events, FIG. 8b illustrates the input data after processing in accordance with an embodiment of the present invention including filtering to correct for phase effects, FIG. 8c illustrates the input data after processing in accordance with an embodiment of the present invention including filtering to correct for both amplitude and phase effects; and FIG. 9 is a schematic illustration of an embodiment of a system for performing methods in accordance with embodiments of the present invention.

DETAILED DESCRIPTION

Figure 3:
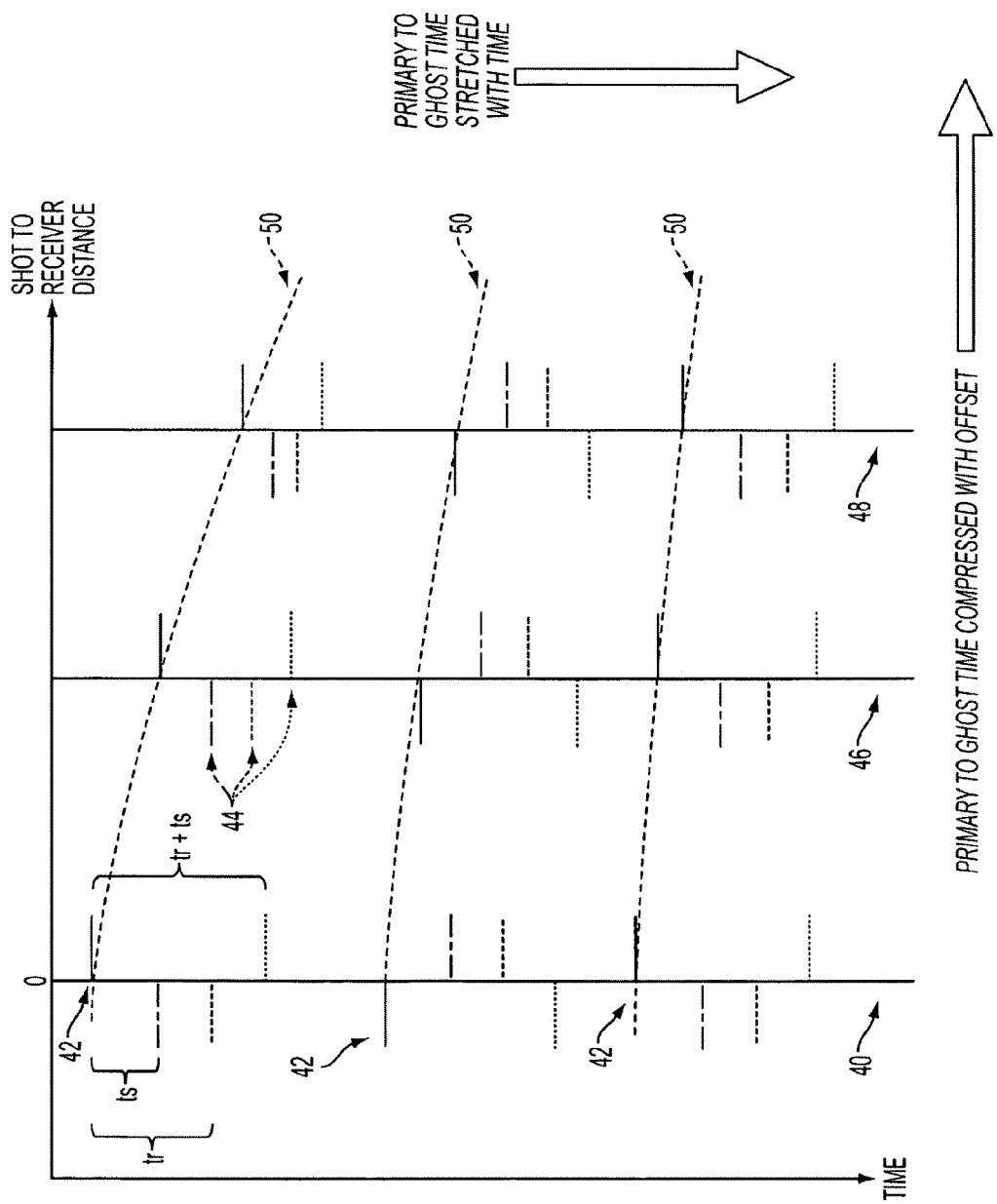
FIG. 3 illustrates a series of seismic traces illustrating a group of primary events and associated ghost events in a time v. offset (t-x) coordinate system.

FIG. 1 schematically illustrates an example of a marine seismic acquisition event. The source 10 and the receiver 12 are each located at respective distances $t_s$, $t_r$ (where distances are described in terms of time for the seismic wave to travel that distance) below the surface 14 of the water. A reflector 16 (which may be, for example, the ocean floor, or some subfloor structure that produces a measurable reflection event at the receiver) causes a primary reflection of the seismic signal, the path of which is shown as solid line 18. Receipt of this primary reflection signal at the receiver is indicated in FIG. 2 at 20.

However, this is not the only path by which the source can produce a signal at the receiver. In particular, the surface 14 of the water will tend to be reflective as well. This additional reflective surface creates an additional three paths by which a signal from the source 10 can reach the receiver 12. First, the signal may reflect from the surface 14, travel to the reflector and directly to the receiver 12 to produce the signal 24 at the receiver. Note that signal 24 is delayed from the primary signal 20 by a time $t_s$ equal to the extra path length resulting from the distance between the source 10 and the surface 14. This path length is related to the distance from the source to the surface and the cosine of the emergence angle of the ghost event at the receiver. Furthermore, it is subject to a 180 degree change in polarity due to the extra reflection. Second, the signal may reflect from the reflector 16 and proceed to the surface 14 and then finally to the receiver 12 along path 26 to produce signal 28. As with signal 22, signal 28 has a reversed polarity due to the single extra reflection and is offset in the time dimension by a time $t_r$ equal to the extra path length resulting from the distance between the receiver 12 and the surface 14. Third, the signal may reflect off the surface 14, the reflector 16, followed by the surface 14 again, traveling along path 30 to produce signal 32. Signal 32, being a double ghost and having two extra reflections has amplitude in the same direction as the primary signal 18. This signal is time-offset by the sum of $t_s$ and $t_r$. Note that FIG. 2 illustrates the case for a zero-offset trace, where $t_s$ is exactly equal to the vertical time between the surface 14 and the source 10. As will be appreciated, as the angle between the source and receiver increases, the extra path length (and therefore travel time) due to the distance between the source and surface or receiver and surface will change accordingly and is not exactly equal to the $t_s$, $t_r$, illustrated in FIG. 1.

FIG. 3 schematically illustrates seismic traces received at three different offsets from three reflectors. Trace 40 represents a zero-offset trace, including the three primary reflections 42 and associated ghost reflections 44. Traces 46 and 48 represent traces from greater offsets and likewise include the primary reflections and associated ghosts. Dashed curves 50 connect common primary events. One approach to a shot gather would be to transform the second and third traces 46, 48 such that each primary event is aligned with its corresponding primary event of the zero offset trace 42. This procedure is known as applying primary event normal move out (NMO). However, as may be seen from the Figure, such a transform will not align ghost or near surface event times (outside of the trivial case of a constant velocity earth and near surface) and will tend to introduce problems in subsequent steps intended to filter out the near surface or ghost events.

In particular, as shot to receiver distance increases, primary reflections are delayed in time with respect to vertical times due to the larger distances covered by the seismic waves. Likewise, as shot to receiver distance increases, the primary to ghost time difference is compressed as the extra ghost path length resulting from the distance between the source or receiver and the surface becomes relatively smaller compared to the total path length (i.e., the path of ghost energy becomes less similar to the path of the primary energy). As viewed in FIG. 1, this can be thought of as the vertices of the paths at the reflector moving further apart with offset. On the other hand, as time increases (i.e., deeper primary reflectors are detected), the primary to ghost time difference approaches the vertical time differences because the paths of the ghost energy become more similar to the paths of the vertically traveling primary energy. That is, the vertices at the reflector of the various paths move closer together.

On the whole, this means that the spacing between primary events and ghost events for traces off of the zero offset trace 40 will be different from the simplified assumption of $t_s$, $t_r$, $t_s+t_r$. Moreover, the difference will change as a function of both time and offset. Thus, if the straightforward NMO discussed above were to be implemented, ghost information would tend to present difficulties in filtering due to its changing frequency characteristics over both time and offset.

Figure 6:
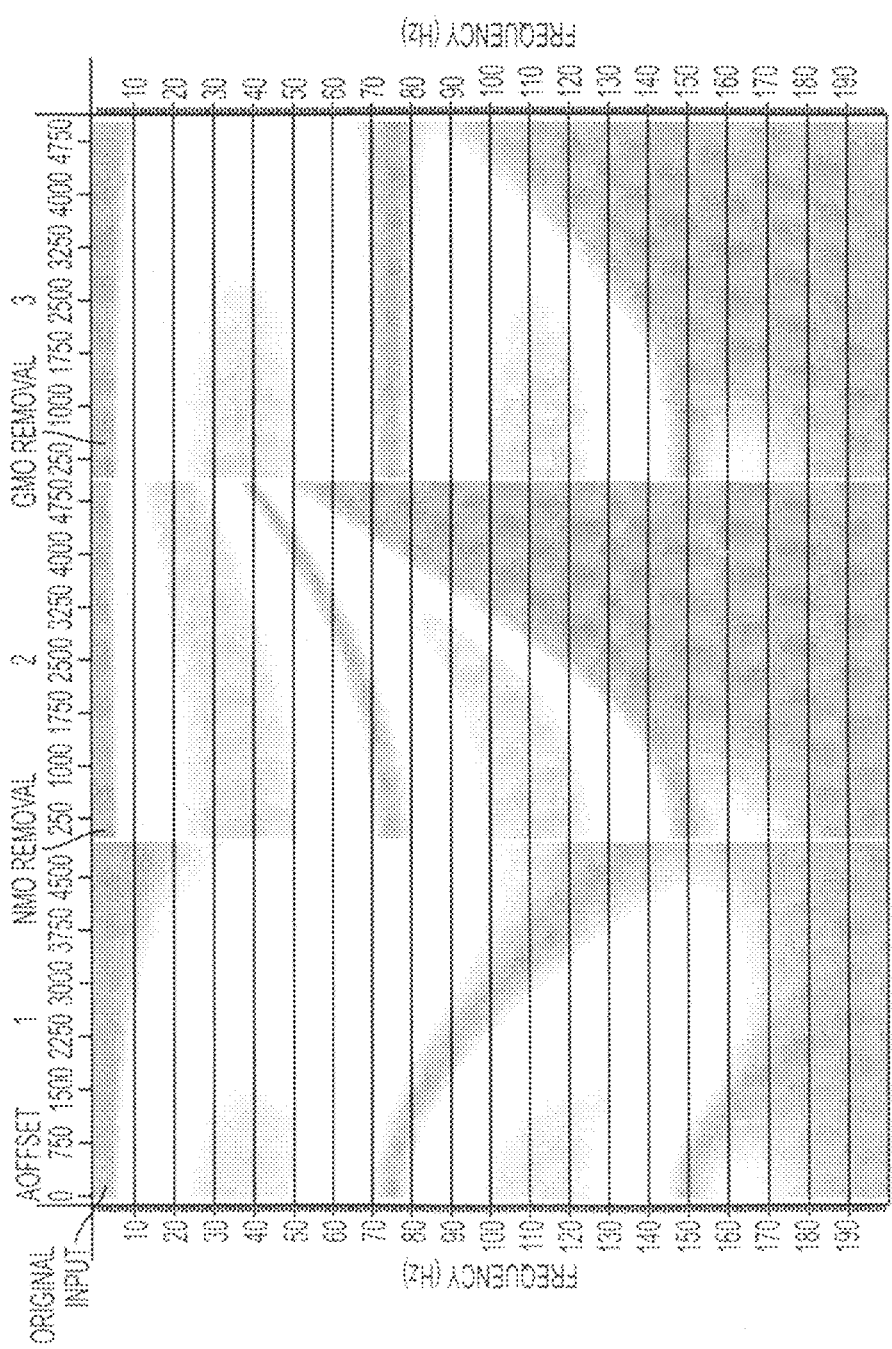
FIG. 6 is a set of f-x plots illustrating raw data, data after being subject to normal move out, and tau-x transformed data, illustrating stabilized notch frequencies in both the offset and frequency dimensions.

An example of this issue is illustrated in FIG. 6, a set of simulated f-x plots of a single primary event and its associated source/receiver ghost events. In accordance with the discussion of FIG. 3, above, it may be seen that the left-hand spectrum of FIG. 6 illustrates spectral notches 60 moving to higher frequencies as offset (x) increases. That is, the notches curve downward and to the right. The central spectrum of FIG. 6 shows the result of NMO transformation of the data. In this case, the spectral notches 60 instead curve upward to the right, or to lower frequencies with increased offset.

In accordance with an embodiment of the invention, a one dimensional lossless transform is developed that allows for stabilization between traces of notch frequencies produced by ghosting, near surface or ocean bottom multiples or similar effects. In particular, the transform is intended to correct offset traces such that ghosting and near surface reflection effects are effectively equalized to those of a zero offset trace. This is illustrated in the right-hand spectrum of FIG. 6, representing a transform in accordance with an embodiment of the invention, where the spectral notches 60 have been aligned. Once such equalization is performed, the data may be filtered using a deterministic or statistical filter in accordance with known techniques. In particular, once the notch frequency behavior has been rendered offset-independent, spatially and temporally independent deconvolution operators may be used to suppress the ghosts.

Figure 4:
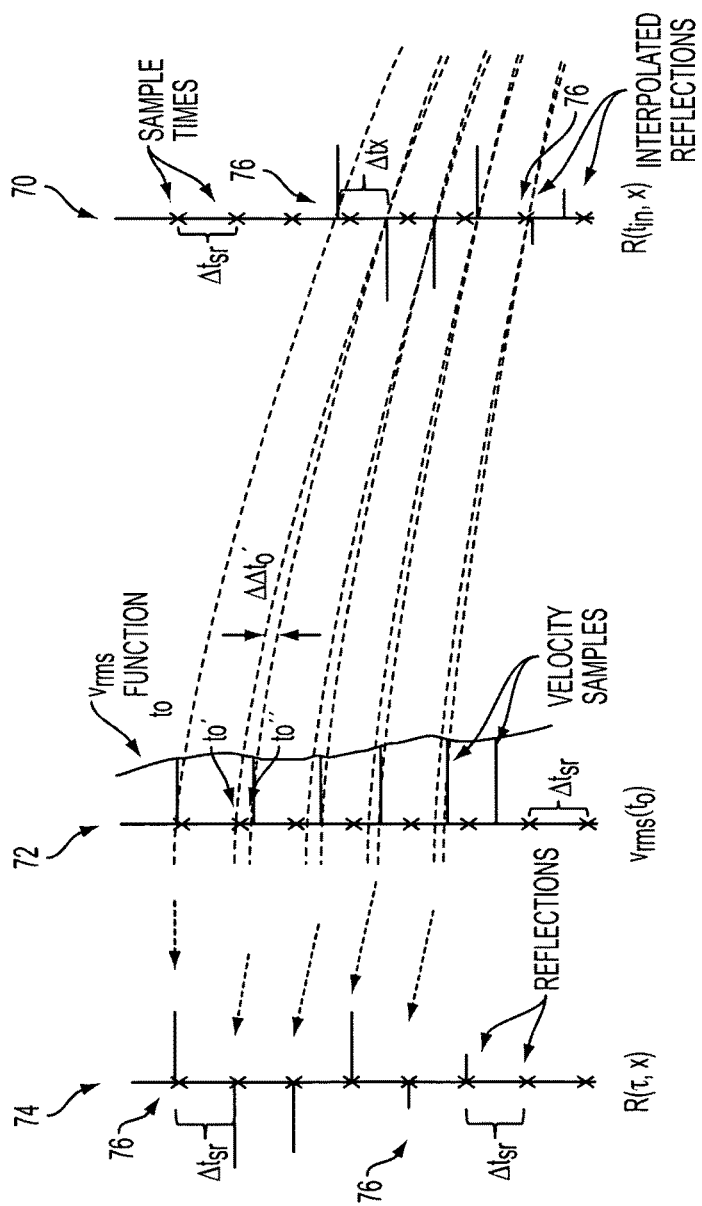
FIG. 4 illustrates an embodiment of a transform for a seismic trace illustrating progressive transformation from an input trace, to selecting a near surface and offset adjusted velocity for moving out successive input trace reflections, to a tau-offset transformed trace, illustrated from right to left, respectively.

FIG. 4 illustrates one embodiment of an approach to developing an appropriate transform. The trace 70 on the right of FIG. 4 is in t-x coordinates and the output trace 74 on the left is in a τ-x coordinate system with equalized near surface effects. In this system, τ (tau) is a time coordinate in which event times have been corrected to vertical emergent angle time, $t_0$ is the zero offset time from surface to reflector, $\Delta t_{sr}$ are the input and output trace and velocity sample rates, x is a trace offset coordinate, $v_{ref}$ is a near surface or reference velocity and $v_{rms}$ is the root mean square velocity of a primary reflection. The input trace 70 at an offset x is acquired in the time dimension t and can be expressed as $R(t_{in}, x)$. At successive output times $\tau=\Delta t_{sr}$, $2\Delta t_{sr}$, ... $n\Delta t_{sr}$, trace reflections $R(t_{in}, x)$ are moved out at a primary velocity $v_{rms}'(t_0)$ which has been corrected by the difference in velocity between a reference layer near surface velocity ($v_{ref}$) and thickness ($t_g$) and the primary reflection velocity ($v_{rms}$) for a layer of time thickness equal to the output sample rate ($\Delta t_{sr}$). The next τ reflection output time requires a $v_{rms}$ at $t_0=t_{last}+\Delta t_{sr}+\Delta\Delta t_0$ where $\Delta\Delta t_0$ is the vertical time difference between a reflection at offset x moved out at the primary velocity and the same reflection moved out at the primary velocity which has been adjusted for the near surface layer velocity $v_{ref}$ and thickness $t_g$. Moving out primary reflections R(tin, x) with the $v_{ref}$ adjusted primary velocities which have been sampled at $\Delta t_{sr}+\Delta\Delta t_0$ in trace 72 produces the R(τ, x) trace 74. As shown in the figure, for reflection outputs at a sample rate $\Delta t_{sr}$, the time between primary events 76 in trace 70 is expanded due to moveout while the time $\Delta t_{sr}+\Delta\Delta t_0$ between consecutive primary velocities in trace 72 is typically increased. The time corrections vanish for zero offset such that ghost arrival times at non-zero offset have been effectively equalized to those of a zero offset trace. In other words, application of this one dimensional transform is equivalent to correcting time differences between successive primaries arriving in a near surface layer of velocity $v_{ref}$ to a vertical time. It should be noted that for the trace 70, some events 76 are interpolated and that for trace 72 some velocities will be interpolated as these do not fall directly on sample times.

In an embodiment, an algorithm for the transform may be expressed as a series of equations to be iteratively evaluated and as illustrated in FIG. 4. The time $t_x$ of a reflection sample to be moved out is determined assuming a hyperbolic velocity relationship between primary reflection arrivals. Equation (1) uses the trace's shot to group offset x, the velocity field value $v_{rms}(t_0)$ interpolated at time $t_0$ and the value of sample time $t_x$ in $R(t_{in}, x)$ to determine an output sample $R(\tau, x)$ at time $\tau_0 = t_0$ in tau space.

$$t_x^2 = t_0^2 + x^2/v_{rms}^2(t_0) \tag{1}$$

Equation (2) is then used to determine a $t_0'$, or sample time for the next reflection's velocity, which differs from the first sample time by the sample rate $\Delta t_{sr}$:

$$t_0' = t_0 + \Delta t_{sr} \tag{2}$$

Equation (3) relates the already developed quantities and a near surface layer vertical time thickness $t_g$ (chosen to be $\geq \Delta t_{sr}$) and reference velocity $v_{ref}$ to a new velocity $v_{rms}(t_0')$ which describes the velocity of the next reflection to be moved out:

$$v_{rms}^2(t_0') = [v_{rms}^2(t_0)(t_0 - t_g + \Delta t_{sr}) + v_{ref}^2(t_g)]/t_0 \tag{3}$$

Based on the now-derived $v_{rms}^2(t_0')$, a new $t_x'$ or time of the next reflection at offset x to be moved out at $\tau = \tau_0 + \Delta t_{sr}$, may be determined in accordance with Equation (4):

$$t_x'^2 = t_0'^2 + x^2/v_{rms}^2(t_0') \tag{4}$$

The time interval between $t_0'$ and the next sample velocity time $t_0''$, which is labeled $\Delta\Delta t_0'$ in FIG. 4, is determined in accordance with Equation (5), which is a non-linear equation in $\Delta\Delta t_0'$ that may be solved, for example, using Newton's method:

$$\Delta\Delta t_0' = ((x^2/v_{rms}^2(t_0') - x^2/v_{rms}^2(t_0' + \Delta\Delta t_0')))^{1/2} \tag{5}$$

Then, using the time interval determined in Equation (5), the time of the next interpolated $v_{rms}$ is determined in accordance with Equation (6):

$$t_0'' = t_0 + \Delta t_{sr} + \Delta\Delta t_0' \tag{6}$$

Finally, for the next output time sample at $\tau = \tau_0 + 2\Delta t_{sr}$, $t_0''$ from Equation (6) replaces $t_0$ in Equation (2) and the calculations in Equations (2) to (6) are repeated.

Figure 5:
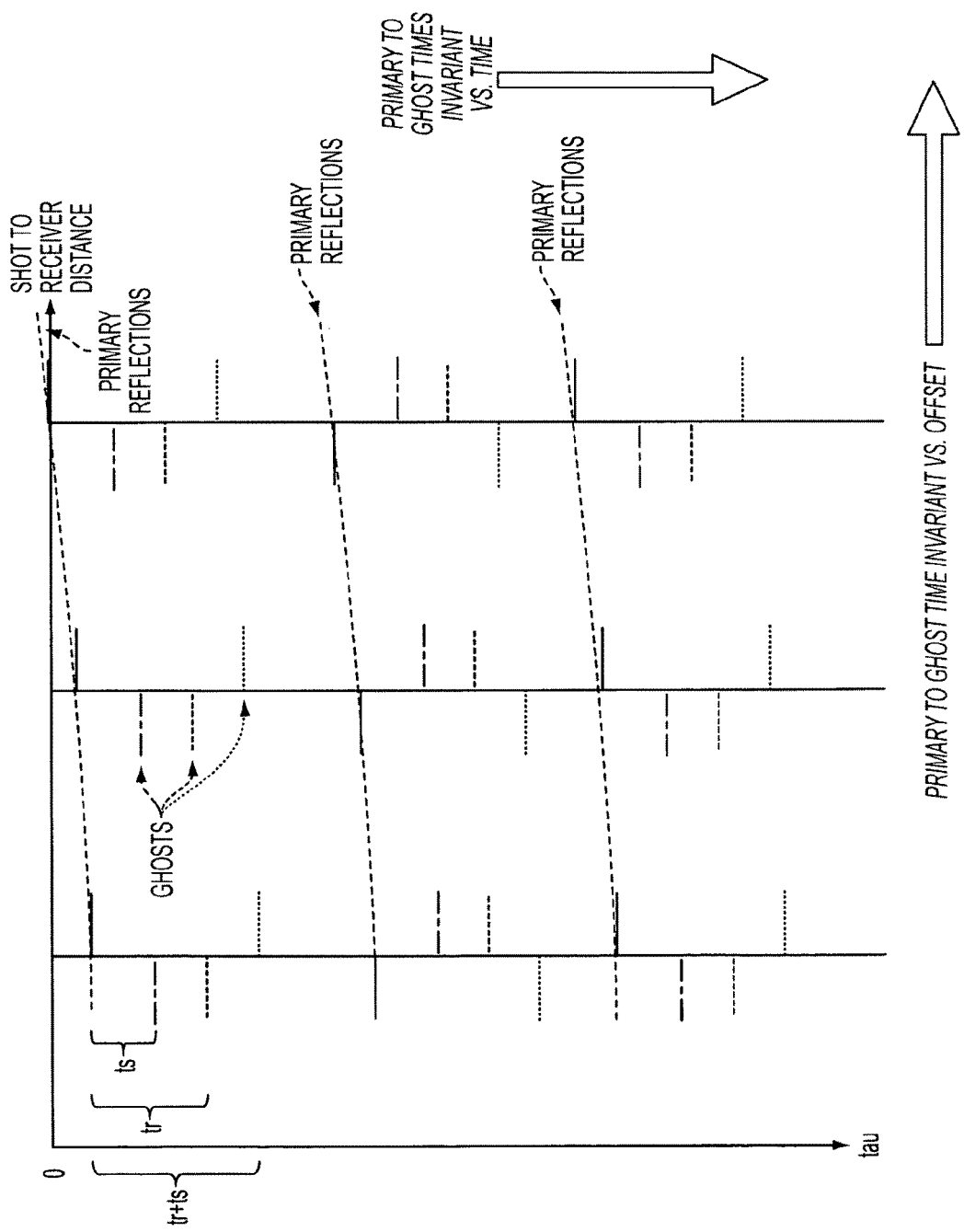
FIG. 5 illustrates a transformed common depth point gather after transforming in accordance with an embodiment of the present invention, illustrating invariance of primary to ghost time in time and offset.

Once this emergence angle correction has been performed, it is possible to correct a common depth point gather as illustrated in FIG. 5. As compared to FIG. 3 it can be observed that the primary to ghost (or near surface event) times are now effectively invariant with respect to time and offset. That is, ghost events have been rendered periodic with respect to the primary events. Once periodic, the ghosts may be filtered using a deterministic or statistical filter as would be understood by one of ordinary skill in the art.

FIG. 6 compares f-x plots of a single simulated primary event and its associated source/receiver ghost events under two different transforms. As discussed above, the left-hand spectrum illustrates the seismic data prior to any transform other than a transform from t-x data into f-x data in which spectral notches 60 move to higher frequencies with x. The center spectrum illustrates the data transformed in accordance with an NMO such that spectral notches 60 move to lower frequencies as x increases. Finally, the right-hand spectrum illustrates a transform in accordance with an embodiment of the invention in which the spectral notches 60 are stabilized with respect to offset. As will be appreciated, this simplifies removing the notches using spatially independent filtering approaches.

Figure 7:
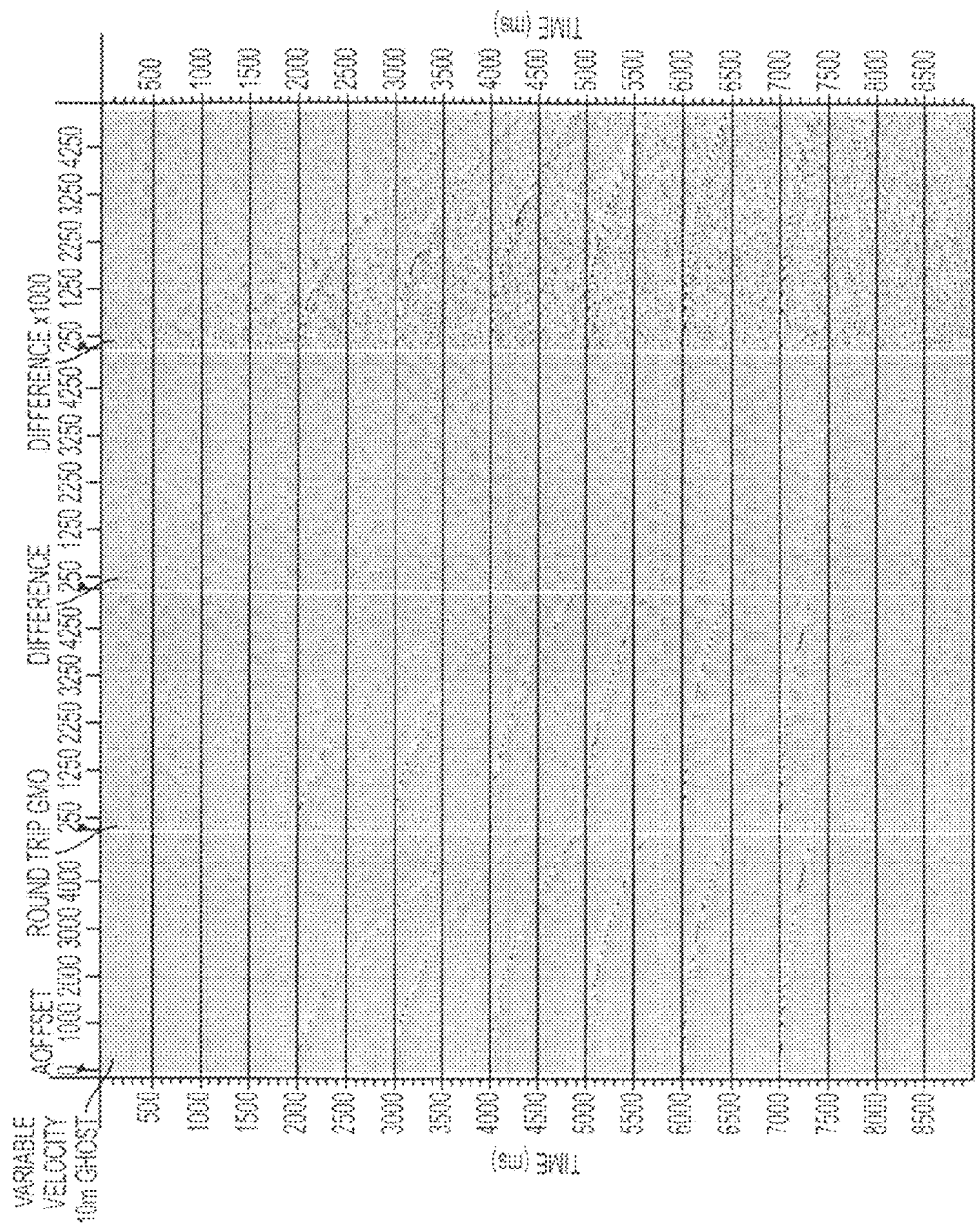
FIG. 7 is a set of t-x plots illustrating the reversibility of a tau-x transform in accordance with an embodiment of the present invention.

FIG. 7 illustrates the reversible nature of a transform in accordance with an embodiment of the present invention. The degree of reversibility of the tau transform is similar to that of forward and inverse NMO transforms. Reversibility is assured if the sample rates of the transformed data exceed the sample rate of the highest frequencies of interest and if the time interpolation function has enough high frequency fidelity to accurately represent the highest frequencies in the data. Each plot is a time-offset plot of a set of seismic data with time on the vertical axis and offset on the horizontal axis. The left-most plot is the input CDP gather. The second plot from the left is the same data after a full cycle of a forward and reverse tau-X transform in accordance with an embodiment of the present invention. The third plot is generated by subtracting the second plot from the first, producing a nearly clear plot and indicating that the forward-reverse cycle causes very little change to the initial data. In order to check the result found in the third plot, the fourth plot represents a $10^3$ amplification of the values of the third plot. As may be seen, under such a 1,000 time amplification, there are detectable differences between the first plot and the forward and reverse transformed plot. However, in view of the large degree of amplification required to see these differences, the reversibility of the transformed may be deemed to be acceptable.

Figure 8C:
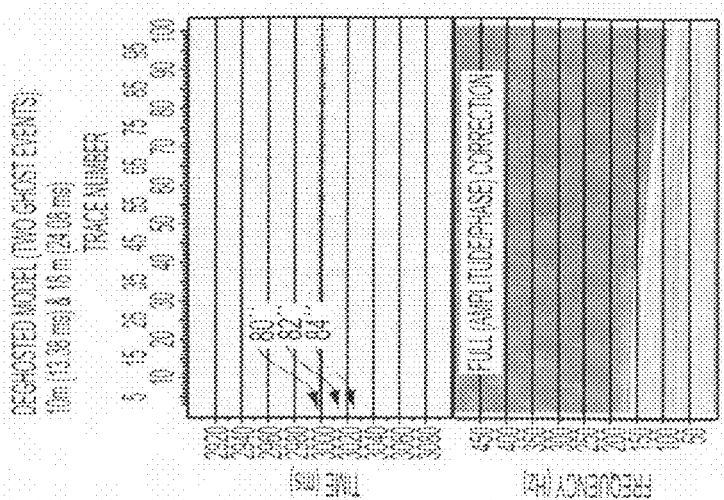
FIG. 8a-8c are each pairs of plots in t-x and f-x domains illustrating filtering using a reversible tau-x transform in accordance with an embodiment of the present invention.
Figure 8B:
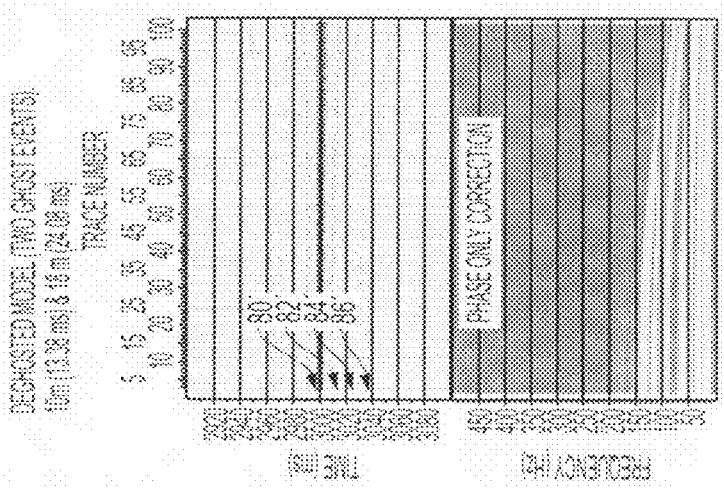
Figure 8A:
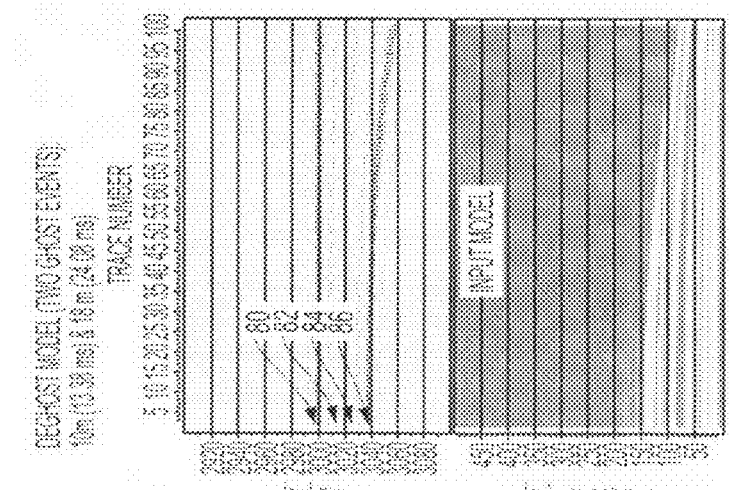

FIGS. 8a-8c illustrate suppression of ghost notches using a deterministic, time and offset invariant filter to place a single primary event into focus. The plots of FIG. 8c are the input model in which the top plot illustrates a primary event 80, two ghosts 82, 84, and a combined ghost 86 which has an apparent amplitude of nearly the same magnitude as that of the primary event 80. Other apparent events are also present, for example artifacts produced by side lobes and interference effects as a result of the application of wavelet transforms. The lower plot of FIG. 8a represents the same data transformed into an f-x coordinate system.

FIG. 8b illustrates the data of FIG. 8a after forward tau-X and Fourier transforms, corrections using deterministic filtering, and reverse Fourier and tau-X transforms are applied. As may be seen, the primary event 80' has been straightened such that it is non-variant with offset, and its contrast has been increased with respect to the ghost events 82', 84'. In particular, the combined ghost 86' has been suppressed significantly such that it is of a significantly smaller amplitude than the primary event 80'.

FIG. 8c is similar to FIG. 8b, however, the deterministic filter is selected to correct for both amplitude and phase effects. In this case, the primary event is not quite as distinct as that of FIG. 8b, but the suppression of the ghost events has been significantly improved, providing greater primary event bandwidth and resolution overall.

In general, source and receiver in a marine acquisition are near the surface in order to help reduce the effects of ghost imaging by ensuring that ghost events are relatively close in time to their associated primary events, and therefore generally distinguishable from a second primary event. In an embodiment, a deep tow source and receiver may be employed resulting in large offset dependent variation in ghosting effects but reduced adverse effects due to weather and sea surface noise. The tau-X transform approach described herein can be used to reduce the effects of the ghosts. In this case, adverse effects due to surface weather conditions can be attenuated.

A system 200 for performing the method is schematically illustrated in FIG. 9. The system includes a data storage device or memory 202. The stored seismic data may be made available to a processor 204, such as a programmable general purpose computer. The processor 204 may include interface components such as a display 206 and a graphical user interface 208, and is used to implement the above-described transforms in accordance with embodiments of the invention. The graphical user interface may be used both to display data and processed data products and to allow the user to select among options for implementing aspects of the method. Data may be transferred to the system 200 via a bus 210 either directly from a data acquisition device, or from an intermediate storage or processing facility (not shown).

Those skilled in the art will appreciate that the disclosed embodiments described herein are by way of example only, and that numerous variations will exist. For example, while the foregoing is described generally in terms of ghosts due to reflections from the surface 14, it applies equally to other near surface layering effects that can cause the receiver to register multiple events. For example, where the data is land data, complex or quickly varying velocity fields may cause reflections similar to surface ghosts from marine data.

The invention is limited only by the claims, which encompass the embodiments described herein as well as variants apparent to those skilled in the art.

The invention claimed is:

1. A computer implemented method for transforming and analyzing seismic trace information, comprising:
obtaining seismic trace information for a plurality of traces, the seismic trace information including shot to receiver offset and a vertical velocity of at least one subsurface primary reflector and including respective information resulting from near-surface layering and velocity and relating to the primary reflector;
reversibly transforming, using a one dimensional lossless transform, seismic trace information from each non-zero offset trace such that the respective information resulting from the near-surface effects at each non-zero offset position is moved in a time dimension such that they become effectively periodic with respect to respective primary reflector information and in accordance with a periodicity for a zero offset trace at the same surface location;
filtering the transformed seismic trace information to remove at least a portion of the information resulting from near-surface effects;
inverting the reversible transforming to produce filtered seismic trace information; and
analyzing the filtered seismic trace information to determine subsurface properties, wherein the reversibly transforming, filtering and inverting steps are performed on one or more computer processors.

2. A method as in claim 1, further comprising:
prior to the filtering, transforming the transformed seismic trace data into a frequency domain, wherein the filtering is performed in the frequency domain to obtain filtered, frequency domain, transformed seismic trace data; and
after the filtering, prior to the inverting, inverse frequency transforming the filtered, frequency domain, transformed seismic trace data and inverting the reversible transforming to produce filtered, time domain seismic trace data.

3. A method as in claim 1, wherein the filtering is performed in a tau domain.

4. A method as in claim 1, wherein the filtering further comprises averaging the transformed seismic trace information to determine the near-surface effect.

5. A method as in claim 1, wherein the removed near-surface effect is due to source and/or receiver ghosts.

6. A method as in claim 1, wherein the filtering further comprises applying a deterministic phase and/or amplitude correcting filter.

7. A method as in claim 1, wherein the filtering further comprises applying a statistically determined phase and/or amplitude correcting filter.

8. A computer system configured to transform seismic trace information for each of a plurality of traces, the seismic trace information including shot to receiver offset and a vertical velocity of at least one subsurface primary reflector and including respective information resulting from near-surface layering and velocity relating to the primary reflector, the system comprising:
one or more processors configured to execute one or more computer program modules, the one or more computer program modules comprising:
a transforming module configured to reversibly transform, using a one dimensional lossless transform, seismic trace information from each non-zero offset trace such that the respective information resulting from the near-surface effects at each non-zero offset position is moved in a time dimension such that they become effectively periodic with respect to respective primary reflector information and in accordance with a periodicity for a zero offset trace at the same surface location;
a filtering module configured to filter the transformed seismic trace information to remove at least a portion of the information resulting from near-surface effects;
an inverting module, configured to invert the reversible transform; and
an analysis module configured to determine subsurface properties.

9. A system as in claim 8, wherein the program modules further comprise:
a domain transforming module configured to transform, prior to the filtering, the transformed seismic trace data into a frequency domain, wherein the filtering is performed in the frequency domain to obtain filtered, frequency domain, transformed seismic trace data; and
an inverse transform module, configured to, after the filtering, prior to the inverting, inverse frequency transform the filtered, frequency domain, transformed seismic trace data and inverting the reversible transforming to produce filtered, time domain seismic trace data.

10. A system as in claim 8, wherein the filtering module operates on the transformed seismic trace information in a tau domain.

11. A system as in claim 8, wherein the filtering module is configured to average the transformed seismic trace information to determine the near-surface effect.

12. A system as in claim 8, wherein the removed near-surface effect is due to source and/or receiver ghosts.

13. A system as in claim 8, wherein the filtering module is further configured to apply a deterministic phase and/or amplitude correcting filter.

14. A system as in claim 8, wherein the filtering module is further configured to apply a statistically determined phase and/or amplitude correcting filter.

* * * * *